(12) United States Patent
Nagaya et al.

(10) Patent No.: US 6,339,868 B1
(45) Date of Patent: Jan. 22, 2002

(54) CUTTING TOOL AND SHRINK FITTING METHOD FOR THE SAME

(75) Inventors: Hidehiko Nagaya; Hiroshi Shimomura, both of Yuuki-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 0 days.

(21) Appl. No.: 09/456,548

(22) Filed: Dec. 8, 1999

(30) Foreign Application Priority Data

Dec. 10, 1998 (JP) .......................................... 10-351977

(51) Int. Cl.⁷ .......................... B23P 11/02; B23C 9/00; B23B 5/22
(52) U.S. Cl. .................... 29/447; 279/102; 279/158; 403/273; 409/131; 409/234
(58) Field of Search ................ 409/234, 232; 29/447; 408/238, 239 R, 240, 60; 175/425; 279/102, 103, 906, 158; 403/273

(56) References Cited

U.S. PATENT DOCUMENTS

| | | | |
|---|---|---|---|
| 3,027,953 A | * | 4/1962 | Coski .......................... 175/425 |
| 3,307,243 A | * | 3/1967 | Andreasson .............. 408/60 X |
| 3,989,260 A | * | 11/1976 | Zonkov et al. ......... 408/240 X |
| 3,994,615 A | | 11/1976 | Narang |
| 4,452,325 A | | 6/1984 | Radd et al. |
| 5,140,739 A | | 8/1992 | Yamaguchi et al. |
| 5,280,671 A | | 1/1994 | Marquart |
| 5,873,687 A | * | 2/1999 | Watanabe ................... 409/234 |
| 5,879,766 A | | 3/1999 | Kato |

FOREIGN PATENT DOCUMENTS

| | | |
|---|---|---|
| DE | 36 07 938 | 9/1987 |
| DE | 39 31 536 | 4/1990 |
| DE | 42 15 606 | 11/1993 |
| DE | 196 38 822 | 3/1998 |
| EP | 1 008 409 | 6/2000 |

* cited by examiner

*Primary Examiner*—William Briggs
(74) *Attorney, Agent, or Firm*—Oblon, Spivak, McClelland, Maier & Neustadt, P.C.

(57) ABSTRACT

A cutting tool including a tool holding portion and a tool. The tool is configured to be inserted into a hole of the tool holding portion. The tool includes a tool main body, a guide portion, and a shoulder portion. The tool maim body has a tool outer diameter larger than the hole inner diameter of the hole when the tool holding portion is not heated. The guide portion is coaxially connected to the tool main body and configured to position the tool substantially coaxially with respect to the tool holding portion. The guide portion has a guide outer diameter smaller than the hole inner diameter of the hole so that the guide portion is inserted into the hole. The shoulder portion is formed between the tool main body and the guide portion so as to sit on a surface around the hole to support the tool when the guide portion is inserted into the hole.

16 Claims, 4 Drawing Sheets

CUTTING TOOL AND SHRINK FITTING METHOD FOR THE SAME

BACKGROUND OF THE INVENTION

1. Field of the Invention

The present invention relates to a cutting tool shrink fitting method and to a cutting tool obtained by this method.

2. Discussion of the Background

FIG. 6 shows a conventional example of a cutting tool fitting method of this type.

This cutting tool 1 is equipped with a tool holding portion 3 and a tool 2. The tool holding portion 3 is configured to be attached to the spindle of a machine tool (not shown). The tool 2 is shrink fitted into the tool holding portion 3.

The tool holding portion 3 includes a tapered arbor 4, a grip 5, and a support portion 7. The tapered arbor 4 is configured to be secured, for example, to the spindle of the machine tool. The grip 5 in the form of a disc has a diameter larger than that of the arbor 4. Further, the grip 5 has a machine tool. The grip 5 in the form of a disc has a diameter larger than that of the arbor 4. Further, the grip 5 has a groove portion to be gripped by a tool replacing arm or the like. The support portion 7 has, for example, a tapered configuration and a substantially cylindrical hole 6 at the center. The arbor 4, the grip 5 and the support portion 7 are formed coaxially and as an integral unit to have a central axis (O) for rotation. The hole 6 of the support portion 7 is equipped with a cylindrical inner peripheral surface 8 having an inner diameter (d) and a bottom surface 9 positioned at the deepest end of the hole 6. A large diameter groove (8a) is coaxially formed in the inner peripheral surface 8.

Only the cylindrical shaft portion at the base end side of the tool 2, which is shrink fitted into the hole 6 of the tool holding portion 3, is shown. This tool 2 has an outer diameter (D) which is somewhat larger than the inner diameter (d) of the hole 6, and the difference between this outer diameter (D) and the inner diameter (d) of the hole 6, (D−d), is the interference.

The shrink fitting method for this cutting tool 1 will be described. First, as shown in FIG. 6, the base end surface (2a) of the tool 2 is placed on the end surface (7a) on the hole opening (6a) side of the tool holding portion 3. The tool 2 is positioned substantially coaxially with the hole 6. This state is a positioning state at a room temperature. An operator maintains the tool 2 in this state manually or by using a jig. Next, the support portion 7 of the tool holding portion 3, which has the hole 6, is heated so that it thermally expands. When the inner diameter (d) has become larger than the outer diameter (D) of the tool 2, the tool 2 is pressed into the hole 6 to fit into the hole 6.

When the hole portion 6 has contracted by cooling, the tool 2 and the tool holding portion 3 are centered with each other and secured each other by the interference pressure.

However, in this cutting tool 1, at the time of positioning prior to the shrink fitting, it is necessary that the operator hold the tool 2 by hand or a jig such that the base end surface (2a) of the tool 2 abuts the end surface 7a where the hole 6 of the tool holding portion 3 opens. Accordingly, the operation was complicated. Furthermore, the hole 6 and the tool 2 must be positioned coaxially at the time of positioning the tool 2 before the tool 2 can be efficiently inserted at the time of heating.

SUMMARY OF THE INVENTION

According to one aspect of the invention, a cutting tool shrink fitting method includes inserting a guide portion which is coaxially connected to a tool main body of a tool into a hole formed in a tool holding portion. A shoulder portion which connects the tool main body and the guide portion sits on a surface around the hole of the tool holding portion in order to position the tool with respect to the tool holding portion. The tool holding portion is heated such that the tool main body of the tool is inserted into the hole. Then, the tool holding portion is cooled.

According to another aspect of the invention, a cutting tool includes a tool holding portion and a tool. The tool holding portion includes a hole having a hole inner diameter. The tool is configured to be inserted into the hole of the tool holding portion. The tool includes a tool main body, a guide portion and a shoulder portion. The tool main body has a tool outer diameter larger than the hole inner diameter of the hole when the tool holding portion is not heated. The guide portion is coaxially connected to the tool main body and configured to position the tool substantially coaxially with respect to the tool holding portion. The guide portion has a guide outer diameter smaller than the hole inner diameter of the hole so that the guide portion is inserted into the hole. The shoulder portion is formed between the tool main body and the guide portion so as to sit on a surface around the hole to support the cool when the guide portion is inserted into the hole.

Further, according to the other aspect of the invention, a cutting tool shrink fitting method includes inserting a guide portion which is coaxially connected to a tool main body of a tool into a hole formed in a tool holding portion in order to support and position the tool substantially coaxially with respect to the tool holding portion such that a shoulder portion which connects the tool main body and the guide portion sits on a surface around the hole of the tool holding portion. The tool holding portion is heated such that the tool main body of the tool is inserted into the hole. The tool holding portion is cooled.

BRIEF DESCRIPTION OF THE DRAWINGS

A more complete appreciation of the invention and many of the attendant advantages thereof will become readily apparent with reference to the following description, particularly when considered in conjunction with the accompanying drawings, in which.

DESCRIPTION OF THE PREFERRED EMBODIMENTS

Figure 1:
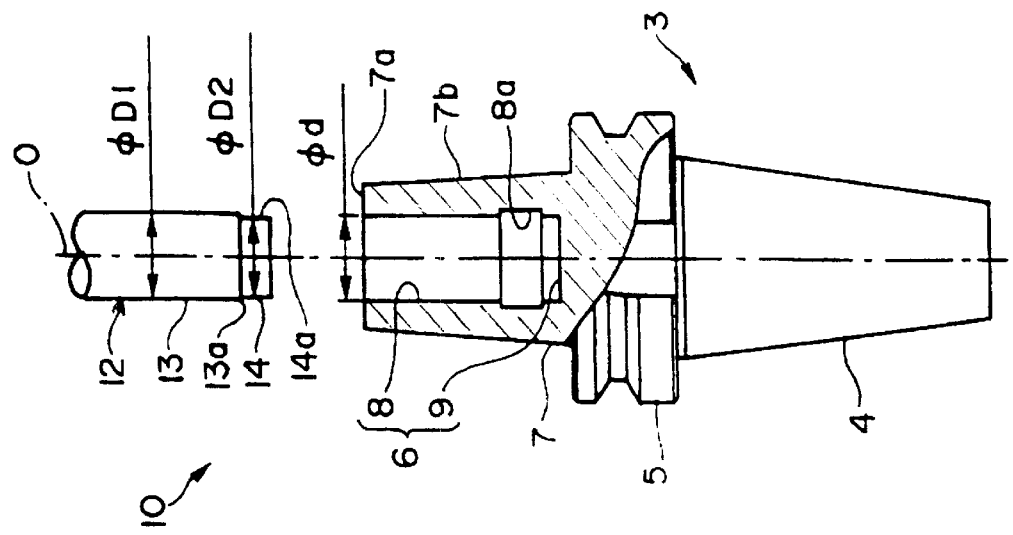
FIG. 1 is a partially cutaway side view of the tool holding portion and the tool of the cutting tool of an embodiment of this invention, showing them in state in which they are separated from each other along the central axis.

The preferred embodiments will now be described with reference to the accompanying drawings, wherein like reference numerals designate corresponding or identical elements throughout the various drawings.

Figure 2:
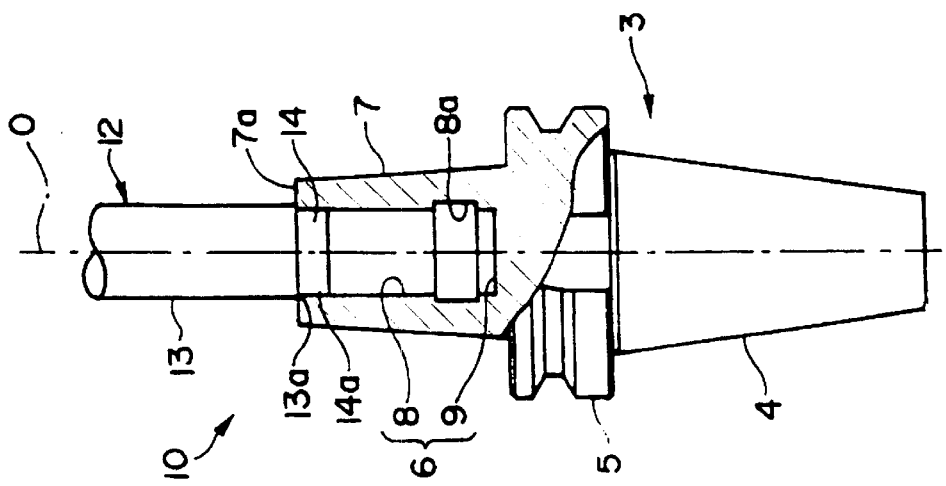
FIG. 2 is a partially cutaway side view of the tool holding portion and the tool guide portion, showing them in a state in which their positioning is effected at room temperature.
Figure 3:
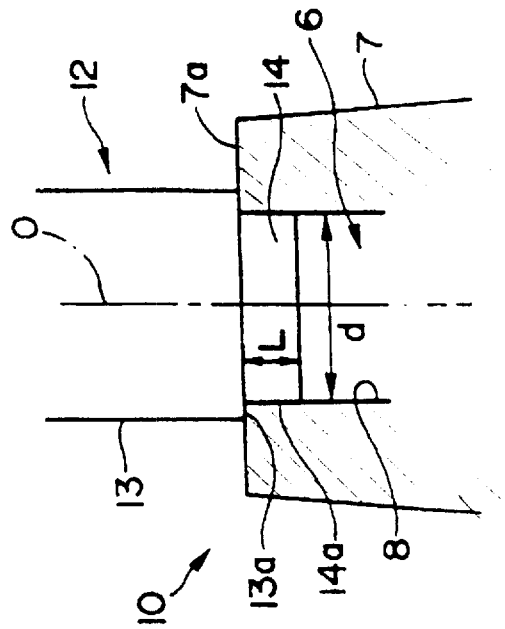
FIG. 3 is a partial enlarged view of the tool holding portion and the tool shown in FIG. 2.
Figure 4:
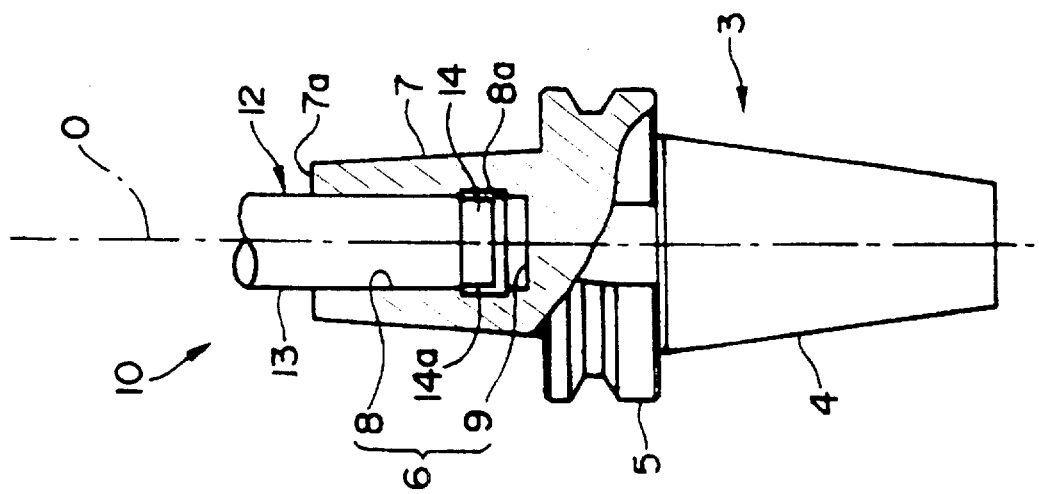
FIG. 4 is a partially cutaway side view showing the tool in the state in which it is fitted into the tool holding portion.

An embodiment of the present invention will be described with reference to FIGS. 1 through 4. The components or members which are the same as those of the conventional technique described above are indicated by the same reference numerals, and a description thereof will be omitted. FIG. 1 is a partially cutaway side view of a tool and a tool holding portion in the state prior to the fitting, showing them in a separated state; FIG. 2 is a partially cutaway side view showing the state in which the tool guide portion has been fitted into the hole of the tool holding portion and positioned therein; FIG. 3 is a partial enlarged view of the portion of FIG. 2 where the tool is fitted into the hole; and FIG. 4 is a longitudinal sectional view of a shrink fitted cutting tool.

The cutting tool 10 includes a tool 12 and a tool holding portion 3. The tool holding portion 3 is configured to be attached to the spindle of a machine tool (not shown). The tool 12 is to be shrink fitted into the tool holding portion 3. The tool holding portion 3 is made of a material having a coefficient of thermal expansion (a coefficient of linear expansion) larger than that of the tool 12. For example, the tool holding portion 3 is made of steel or the like, and the tool 12 is made of a hard material, for example, cermet, ceramic or the like.

The tool holding portion 3 includes a tapered arbor 4, a grip 5, and a support portion 7. The tapered arbor 4 is configured to be secured to, for example, the spindle of the machine tool. The grip 5 in the form of a disc has a diameter larger than that of the arbor 4. Further, the grip 5 has a groove portion to be gripped by a tool replacing arm or the like. The support portion 7 has, for example, a tapered configuration and has a substantially cylindrical hole 6 at the center of the support portion 7. The arbor 4, the grip 5 and the support portion 7 are formed coaxially and as an integral unit to have a central axis (O) for rotation. The hole 6 of the support portion 7 has a cylindrical inner peripheral surface 8 and a bottom surface 9 which is positioned at the deepest end of the hole 6. The hole 6 has an inner diameter (d). A large diameter groove (8a) is coaxially formed in the inner peripheral surface 8 in the vicinity of the bottom surface 9.

In the drawings, only a base side portion of the tool 12 is shown. The base side portion is to be fitted into the hole 6 of the tool holding portion 3. The base side portion of the tool main body 13 of the tool 12, which is to be fitted into the tool holding portion 3, is formed as a cylinder having an outer diameter (D1). A cylindrical guide portion 14 is integrally formed on a base end surface (13a) the tool main body 13. The cylindrical guide portion 14 has an outer diameter (D2) which is somewhat smaller than (D1). In order that this guide portion 14 may be tightly inserted into the hole 6 of the tool holding portion 3, the outer diameter (D2) of the guide portion 14 is slightly smaller than the inner diameter (d) of the hole 6. The outer diameter (D1) of the tool main body 13 is somewhat larger than the inner diameter (d) of the hole 6 at room temperature.

In the state shown in FIG. 4, the tool main body 13 of the tool 12 is shrink fitted into the hole 6. The difference between the outer diameter (D1) of the tool main body 13 and the inner diameter (d) of the hole 6, (D1−d), serves as the interference, and by the interference pressure due to this interference, the tool 12 and the tool holding portion 3 are firmly fastened to each other.

The guide portion 14 and the tool main body 13 are formed coaxially with respect to the central axis (O). The connecting section between the peripheral surface (14a) of the guide portion 14 and the end surface 13a of the tool main body 13 is a step portion having a right angle as shown in FIG. 3. The ring-shaped end surface (13a) constitutes a shoulder portion.

It is desirable that the length (L) of the guide portion 14 as measured along the central axis (O) be set in the range of (d/4) to (d). When the length (L) is smaller than (d/4), there is the danger of the tool 12 being inclined with respect to the tool holding portion 3 when the guide portion 14 is inserted into the hole 6 for fitting at room temperature. On the other hand, when the length (L) is larger than (d), the interference length when the tool 12 is fitted is small, resulting in a small fitting strength.

The cutting tool of this embodiment is constructed as described above. Next, the shrink fitting method will be described.

In the state shown in FIG. 1, the tool holding portion 3 and the tool 12 are separated from each other. Then, as shown in FIGS. 2 and 3, the tool holding portion 3 is stood substantially vertically such that the opening of the hole 6 is directed upwardly, and the guide portion 14 of the tool 12 is inserted into the hole 6 of the tool holding portion. In this condition, the peripheral surface (14a) of the guide portion 14 contacts the inner peripheral surface 8 of the hole 6. Further, the end surface (13a) constituting the shoulder portion of the tool main body 13 abuts the end surface (7a) around the hole 6 of the tool holding portion 3. Accordingly, the tool holding portion 3 and the tool 12 are positioned coaxially with respect to the central axis (O).

In this condition, the tool 12 is held coaxially with respect to the tool holding portion 3, namely, an initial positioning is achieved, without holding the tool 12 by hand, a jig or the like.

In this state, the outer peripheral surface (7b) of the support portion 7 of the tool holding portion 3 is heated, whereby the hole 6 thermally expands and its diameter increases. When the inner diameter (d) of the hole 6 has become larger than the outer diameter (D1) of the tool main body 13, the tool main body falls into the hole 6, and a part of the tool main body 13 is fitted into the hole 6 as shown in FIG. 4. Then, the tool holding portion 3 is cooled. Accordingly, the tool main body 13 is firmly fixed to the tool holding portion 3 by interference pressure caused by the interference, i.e., the difference (D1−d) between the outer diameter (D1) of the tool main body 13 and the inner diameter (d) of the hole 6.

As described above, in this embodiment, the tool 12 and the tool holding portion 3 can be held coaxially in the state prior to the heating, and as a result of the subsequent heating, the tool 12 automatically falls into the hole 6 of the tool holding portion 3, using the guide portion 14 as the guide, and is fitted into the hole. Thus, the positioning of the tool 12 with respect to the tool holding portion 3 and the fitting at the time of shrink fitting can be conducted easily without supporting or pressing the tool 12 with hand, a jig or the like.

Figure 5:
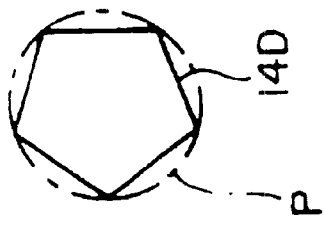
FIGS. 5(a), 5(b), 5(c) and 5(d) are plan views showing other examples of the configuration of the guide portion.
Figure 5:
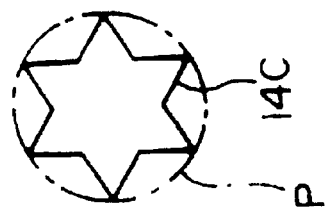
Figure 5:
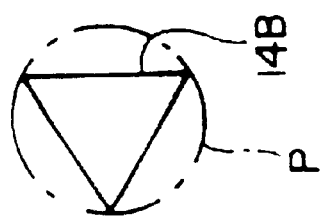
Figure 5:
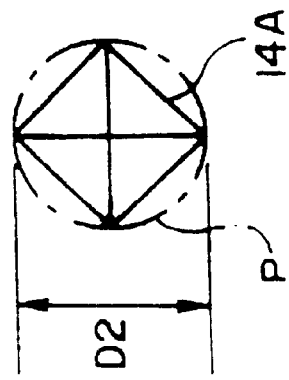
Figure 6:
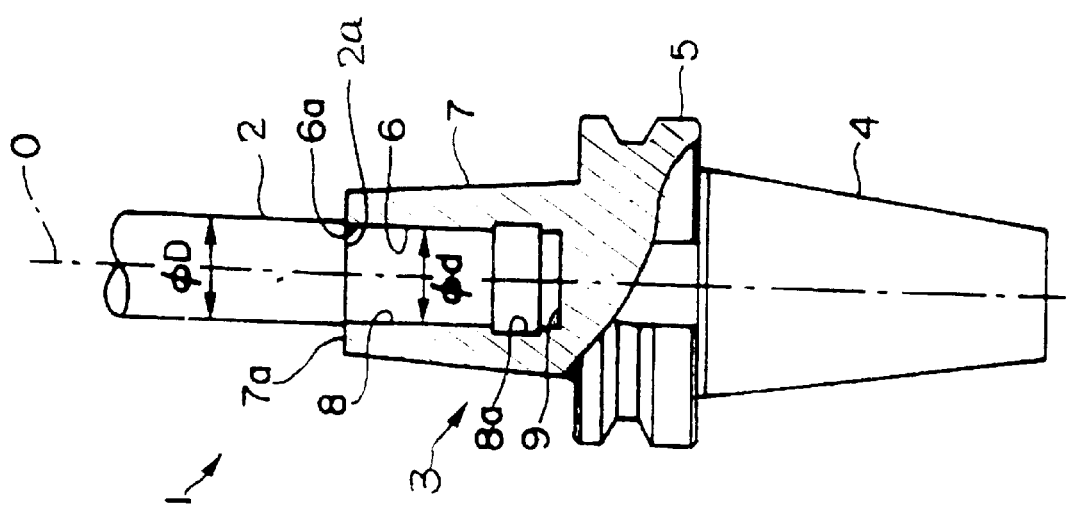
FIG. 6 is a partially cutaway side view showing how positioning is effected at room temperature in a conventional shrink fitting method.

While in the above-described embodiment the guide portion 14 is cylindrical, this should not be construed restrictively. It is also possible, for example, to form a guide portion 14A in the form of a square pole as shown in FIG. 5(a). In this case, the circumscribed circle (P) of the guide portion (14A) has a diameter (D2). When the guide portion (14A) is inserted into the hole 6, it tightly abuts the inner peripheral surface 8 of the hole 6, making it possible to hold the tool 12 and the tool holding portion 3 coaxially.

Similarly, it is possible to adopt any appropriate configuration of the guide portion lying on the circumscribed circle (P), for example, a guide portion (14B) in the form of a triangle pole shown in FIG. 5(b), a guide portion (14C) in the form of a star pole shown in FIG. 5(c), or a guide portion (14D) in the form of a pentagonal pole shown in FIG. 5(d).

Further, while in the above-described embodiment the tool 12 is formed of hard metal or the like and the tool holding portion 3 is formed of steel or the like, the materials of the components are not restricted to these, and it is possible to adopt various materials. Furthermore, it is not necessary for the components to be formed of different materials. They may be formed of the same material.

The present invention is applicable to various types of cutting tool, for example, turning tools or rotary cutting tools such as end mills and drills.

As described above, in the cutting tool and the shrink fitting method according to the embodiments of the present invention, mutual positioning can be effected by inserting the guide portion into the hole of the tool holding portion prior to the heating, and there is no need to hold the tool for shrink fitting; since the tool main body automatically falls into the hole by heating the tool holding portion after that, the shrink fitting can be effected simply and easily, and centering can also be effected.

In the embodiments of the present invention, the guide portion of the tool is inserted into the hole of the tool holding portion prior to the heating, and the shoulder portion connected to the guide portion of the tool is seated on the surface around the hole of the tool holding portion, whereby positioning can be effected, and the tool can be held coaxially with respect to the tool holding portion. And when the portion around the hole is heated so that it may undergo thermal expansion, the diameter of the hole is enlarged, so that the tool is guided by the guide portion and automatically gets into the hole. When the hole portion is cooled, the tool is fitted into the hole and firmly secured therein, and centering is also effected.

Positioning can be effected by inserting the guide portion of the tool into the hole of the tool holding portion prior to the heating, and there is no need to hold the tool for shrink fitting, after which the tool main body automatically falls into the hole by heating the tool holding portion, and by fitting can be effected by cooling, so that shrink fitting can be effected easily.

The length L of the guide portion as measured along the central axis of the guide portion may be set in the range of substantially (d/4) to (d), where (d) is the inner diameter of the hole.

When the length (L) is smaller than (d/4), the tool may not be held coaxially with respect to the tool holding portion when the guide portion is inserted into the hole. On the other hand, when the length is larger than d, the interference length of the tool main body and the hole is too small, so that the requisite strength cannot be obtained.

Obviously, numerous modifications and variations of the present invention are possible in light of the above teachings. It is therefore to be understood that, within the scope of the appended claims, the invention may be practiced otherwise than as specifically described herein.

What is claimed as new and is desired to be secured by Letters Patent of the United States is:

1. A cutting tool shrink fitting method comprising:
    inserting a guide portion which is coaxially connected to a tool main body of a tool into a shrink fitted portion of a hole formed in a tool holding portion;
    seating a shoulder portion which connects the tool main body and the guide portion on a surface around the hole of the tool holding portion in order to position the tool with respect to the tool holding portion, the tool main body having an insert portion which is configured to be shrink fitted in the shrink fitted portion of the hole, the insert portion having a tool outer diameter larger than the hole inner diameter (d) of the shrink fitted portion of the hole;
    heating the tool holding portion such that the insert portion of the tool main body of the tool is inserted into the shrink fitted portion of the hole; and
    cooling the tool holding portion.

2. A cutting tool shrink fitting method comprising:
    inserting a guide portion which is coaxially connected to a tool main body of a tool into a shrink fitted portion of a hole formed in a tool holding portion in order to support and position the tool substantially coaxially with respect to the tool holding portion such that a shoulder portion which connects the tool main body and the guide portion sits on a surface around the hole of the tool holding portion, the tool main body having an insert portion which is configured to be shrink fitted in the shrink fitted portion of the hole, the insert portion having a tool outer diameter larger than the hole inner diameter (d) of the shrink fitted portion of the hole;
    heating the tool holding portion such that the insert portion of the tool main body of the tool is inserted into the shrink fitted portion of the hole; and
    cooling the tool holding portion.

3. A method according to claim 1, further comprising:
    standing the tool holding portion substantially vertically such that an opening of the hole is directed upwardly.

4. A method according to claim 1, wherein the tool holding portion is made of a material having a coefficient of linear expansion larger than that of the tool.

5. A method according to claim 1, wherein a length of the guide portion along an axial direction of the tool is substantially from (d/4) to (d).

6. A method according to claim 1, wherein the guide portion is formed to have a cylindrical shape.

7. A method according to claim 1, wherein the guide portion is formed to have a cross sectional shape of a polygon.

8. A method according to claim 7, wherein the guide portion is formed such that a guide outer diameter of a circumcircle of the guide portion is smaller than a hole inner diameter (d) of the hole, and wherein a tool outer diameter of the tool main body is larger than the hole inner diameter (d) of the hole when the tool holding portion is not heated.

9. A method according to claim 1, wherein the shoulder portion is formed to extend in a plain substantially perpendicularly to an axial direction of the tool.

10. A cutting tool comprising:
    a tool holding portion including a hole having a shrink fitted portion with a hole inner diameter (d); and
    a tool configured to be inserted into the hole of the tool holding portion and made of a material having a coefficient of linear expansion smaller than that of the tool holding portion, the tool comprising:
        a tool main body having an insert portion which is configured to be shrink fitted in the shrink fitted portion of the hole, the insert portion having a tool outer diameter larger than the hole inner diameter (d) of the hole when the tool holding portion is not heated;

a guide portion coaxially connected to the tool main body and configured to position the tool substantially coaxially with respect to the tool holding portion, the guide portion having a guide outer diameter smaller than the hole inner diameter (d) of the shrink fitted portion of the hole so that the guide portion is inserted into the shrink fitted portion of the hole; and a shoulder portion formed between the tool main body and the guide portion so as to sit on a surface around the hole to support the tool when the guide portion is inserted into the shrink fitted portion of the hole.

11. A cutting tool according to claim 10, wherein the tool holding portion is made of a material having a coefficient of linear expansion larger than that of the tool.

12. A cutting tool according to claim 10, wherein a length of the guide portion along an axial direction of the tool is substantially from (d/4) to (d).

13. A cutting tool according to claim 10, wherein the guide portion is formed to have a cylindrical shape.

14. A cutting tool according to claim 10, wherein the guide portion has a cross sectional shape of a polygon.

15. A cutting tool according to claim 14, wherein the guide portion is formed such that a guide outer diameter of a circumcircle of the guide portion is smaller than a hole inner diameter (d) of the hole, and wherein a tool outer diameter of the tool main body is larger than the hole inner diameter (d) of the hole when the tool holding portion is not heated.

16. A cutting tool according to claim 10, wherein the shoulder portion is formed to extend in a plane substantially perpendicularly to an axial direction of the tool.

* * * * *